United States Patent [19]

Blaser

[11] Patent Number: 5,006,719
[45] Date of Patent: Apr. 9, 1991

[54] DEVICE FOR DETECTING THE EDGE LOCATION OF AN OBJECT

[75] Inventor: Peter T. Blaser, Dielheim, Fed. Rep. of Germany

[73] Assignee: Heidelberger Druckmaschinen AG, Heidelberg, Fed. Rep. of Germany

[21] Appl. No.: 385,738

[22] Filed: Jul. 26, 1989

[30] Foreign Application Priority Data

Jul. 26, 1988 [DE] Fed. Rep. of Germany ....... 3825295

[51] Int. Cl.$^5$ .......................................... G01N 21/86
[52] U.S. Cl. ............................... 250/560; 250/227.11
[58] Field of Search ............... 250/227, 560, 561, 571, 250/227.11; 356/373, 375, 376, 386, 387

[56] References Cited

U.S. PATENT DOCUMENTS

| | | | |
|---|---|---|---|
| 3,513,321 | 5/1970 | Sherman | 250/560 |
| 3,619,626 | 11/1971 | Rudolph | 250/561 |
| 3,761,723 | 9/1973 | DeCock | 250/560 |
| 3,890,509 | 6/1975 | Maxey | 250/561 |
| 4,192,613 | 3/1980 | Hammar | 356/386 |
| 4,555,633 | 11/1985 | Björkelund | 250/560 |
| 4,559,451 | 12/1985 | Curl | 250/560 |
| 4,559,452 | 12/1985 | Igaki et al. | 250/561 |
| 4,636,639 | 1/1987 | Guillaume et al. | 250/560 |

FOREIGN PATENT DOCUMENTS

| | | |
|---|---|---|
| 0095948 | 12/1983 | European Pat. Off. . |
| 1448409 | 12/1968 | Fed. Rep. of Germany . |
| 2046602 | 6/1972 | Fed. Rep. of Germany . |
| 2317428 | 11/1973 | Fed. Rep. of Germany . |
| 2615143 | 10/1977 | Fed. Rep. of Germany . |
| 3117004 | 2/1982 | Fed. Rep. of Germany . |
| 1369597 | 7/1964 | France . |

OTHER PUBLICATIONS

Patent Abstracts of Japan, vol. 6, No. 245 (P-159) (1123), 12/3/82; JP-A 57 142503 (Tokyo Shibaura Denki K. K.) 9/3/82.

Primary Examiner—David C. Nelms
Assistant Examiner—Stephone B. Allen
Attorney, Agent, or Firm—Herbert L. Lerner; Laurence A. Greenberg

[57] ABSTRACT

Device for detecting a position of an edge includes a row of light-emitting elements forming an angle with the edge, an optoelectric transducer disposed adjacent the light emitter elements for receiving light emitted by the light emitting elements, first means for guiding the edge between the row of light-emitting elements and the optoelectric transducer, second means for pulsatingly energizing the light-emitting elements sequentially, and third means for scanning an output voltage of the optoelectric transducer in synchronism with the pulsating energization of the light-emitting elements.

9 Claims, 2 Drawing Sheets

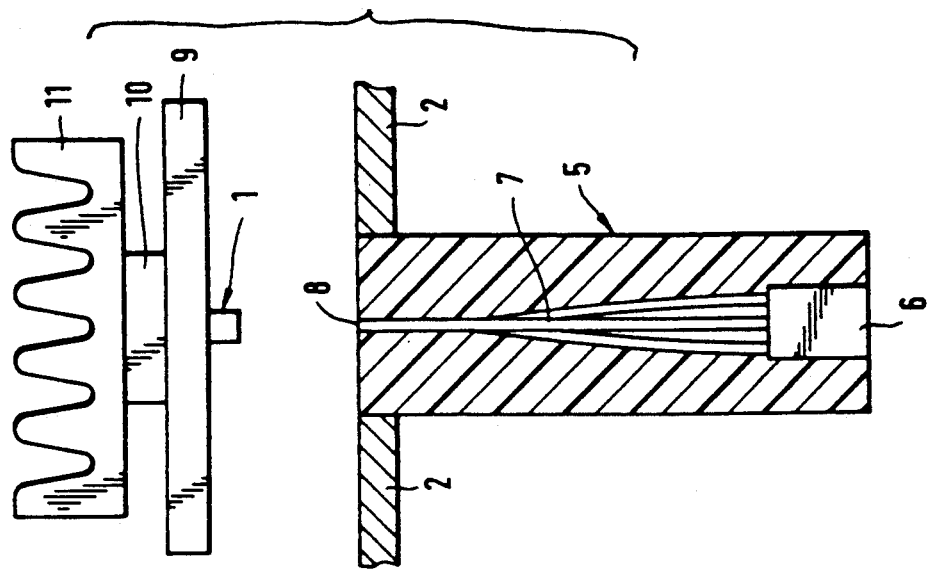
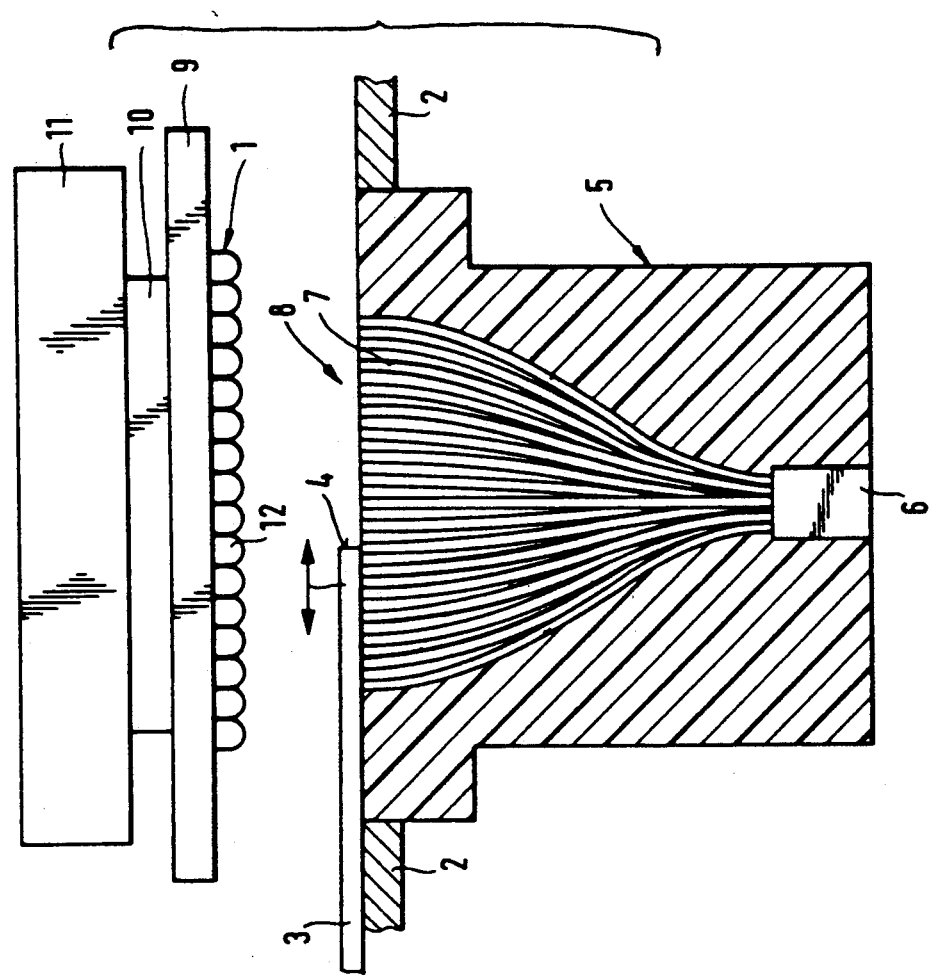
Fig. 1a
Fig. 1b

DEVICE FOR DETECTING THE EDGE LOCATION OF AN OBJECT

The invention relates to a device for detecting the position of an edge, and more particularly of an edge of paper in a printing machine.

In order to achieve a specific level of register accuracy in multi-color sheet-fed printing machines, it is necessary to position the sheet of paper with suitable accuracy. In this regard, it is necessary to detect the position of the paper.

Various devices have become known heretofore for detecting the position of the edge of a sheet of paper in a printing machine, those devices employing transmitted or reflected-light barriers which, however, are capable of detecting only one specific position i.e. they are able to detect or establish whether the edge of the paper is on this side or on that side of a specified position. Other heretofore known devices employ a row of optoelectric receivers, especially so-called CCD-sensor rows. Such devices are relatively expensive, however, and not the least because of the high price of the CCD-sensors; but they are able to determine the position as a numerical value.

In another heretofore known device described in Published Non-Prosecuted Patent Patent Application (DE-OS) 20 48 60, a measuring head is constructed in such a manner that, for example, a photoelectric cell with wedge-shaped light incidence serves for scanning the lateral position of a sheet, so that a specific photoelectric current corresponds to each lateral position. Such analog scanning is problematical, however, for different types and colors of paper.

It is an object of the invention to provide a low-cost device for detecting the position of an edge, particularly of an edge of paper in a printing machine, which is furthermore of sufficient accuracy and detects sufficiently rapidly changes in the position of the edge.

With the foregoing and other objects in view, there is provided a device for detecting a position of an edge comprising a row of light-emitting elements forming an angle with the edge, an optoelectric transducer disposed adjacent the light emitter elements for receiving light emitted by the light emitting elements, first means for guiding the edge between the row of light-emitting elements and the optoelectric transducer, second means for pulsatingly energizing the light-emitting elements sequentially, and third means for scanning an output voltage of the optoelectric transducer in synchronism with the pulsating energization of the light-emitting elements.

In accordance with another feature of the invention, the light-emitting elements are light-emitting diodes (LEDs).

The row may be disposed perpendicularly with respect to the edge. It is also possible, however, to select other angles between the edge and the row. When the angle is smaller, an increase in the resolution of measurement for a given distance between the light-emitting elements occurs.

In addition to the slight expense, a further advantage of the device according to the invention is that changes and irregularities, respectively, in the transparency of the paper or the respective other material do not contribute towards a distortion of the measurement result, as long as the signal difference between the direct illumination of the optoelectric transducer and the illumination by the paper is detectable with the aid of a threshold-value circuit. Finally, it is advantageous that the power consumption of the device according to the invention is low because only one LED lights up at any respective time.

Rows of LEDs suitable for the device according to the invention are already known in the art and are being manufactured. Thus, for example, Telefunken manufactures a row of LEDs having 16 LEDs per millimeter, which corresponds to a grid dimension of 62.5 um, of the type designated as TPAC 6080. This row of LEDs is actually intended for use as an exposure element in copiers and laser printers.

In accordance with another feature of the invention, the device includes a converter formed of glass fibers bunched so as to define a varying cross section for concentrating the light emitted by the light-emitting elements. It is also within the scope of the invention, however, to concentrate the light by means of non-illustrated lenses or mirrors.

In accordance with an additional feature of the invention, the second means comprise a control circuit for energizing the light-emitting elements sequentially in synchronism with a supplied clock signal, the optoelectric transducer having an output connected via a threshold-value circuit to a logic circuit, the logic circuit being actuatable for further transmitting, as a signal identifying the position of the edge, an output signal of the control circuit which is present when there is a step-change in amplitude of the output voltage of the optoelectric transducer.

In accordance with a further feature of the invention, the control circuit and the logic circuit are at least partly formed by a microcomputer.

In accordance with an added feature of the invention, a counter serves as an address generator for the light-emitting elements which are to be energized, respectively, the counter having outputs connected via a code converter to the light-emitting elements, the counter being settable by the microcomputer, and including a clock generator for driving the microcomputer, the counter, the code converter and the light-emitting elements.

In accordance with yet another feature of the invention, the output of the optoelectric transducer is connected via an amplifier and the threshold-value circuit to an input of the microcomputer.

In accordance with yet a further feature of the invention, in addition to a first operating state wherein respectively adjacent light-emitting elements are energized sequentially, there is provided a second operating state wherein energization of certain of the light-emitting elements is skipped.

In accordance with a concomitant feature of the invention, only a given section of the light-emitting elements wherein the edge is locatable is energizable.

A further development of the invention consists in that a glass-fiber shape converter is provided for concentrating the light emitted by the light-emitting elements. Within the scope of the invention, however, it is also possible to concentrate the light by means of lenses or mirrors.

Due to the foregoing further development of the invention, it is possible to determine the approximate position of the edge, initially, by energizing every tenth diode, for example, whereupon each LED is switched over to the synchronization in order to determine the precise position of the edge.

It is further possible to save time and speed up the determination of the position of the edge, respectively, by means of the last mentioned concomitant feature of the invention wherein only that sector or section of light-emitting elements is energized in which, based upon prior measurements and taking into account the characteristics of the printing press, it is possible for the edge of the paper to be located.

Depending upon the particular requirements, the value for the position of the paper edge determined by the device according to the invention may be displayed or indicated and/or used for controlling paper-guiding elements in the sense of a position-control system.

Other features which are considered as characteristic for the invention are set forth in the appended claims.

Although the invention is illustrated and described herein as embodied in a device for the detection of the position of an edge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1a is a front elevational view, partly in longitudinal section, of a detection device according to the invention;

FIG. 1b is a side elevational view, partly in cross section, of the detection device of FIG. 1a;

Like parts in the figures are identified by the same reference characters.

Figure 2:
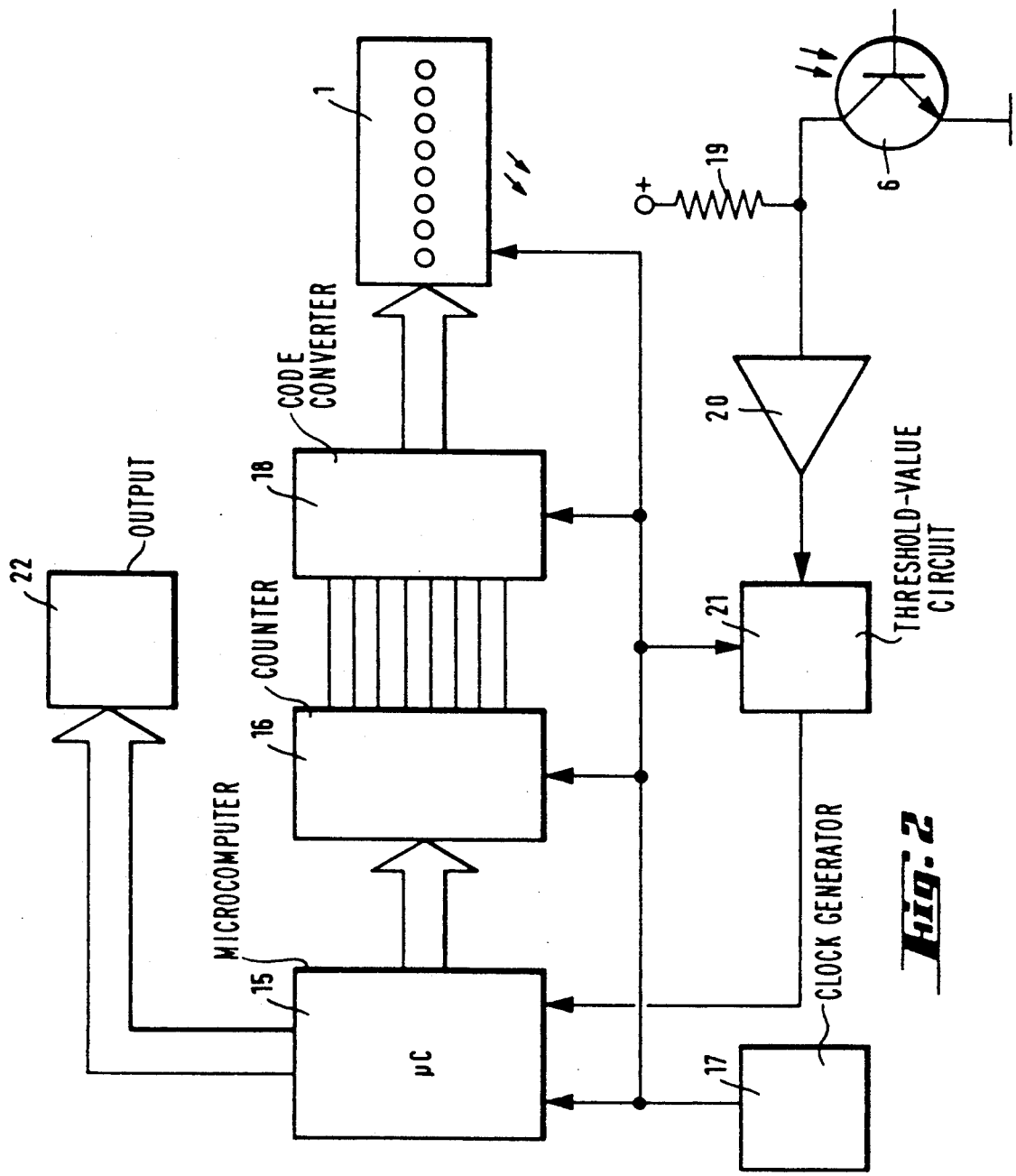
FIG. 2 is a partly diagrammatic block diagram of a circuit arrangement for operating the device of FIGS. 1a and 1b.

Referring now more specifically to FIGS. 1a and 1b of the drawing, there is shown therein a row 1 of light-emitting diodes (LEDs) disposed above a table 2, on which there is transported a sheet of paper 3 having an edge 4 which is subject to undesired shifts in the direction of the double arrow as a result of inaccuracies of non-illustrated paper guiding elements. In order to be able to correct these shifts or at least to be able to indicate them, the position of the edge 4 is determined and measured, respectively, with the aid of the device according to the invention.

Positioned opposite the row 1 of LEDs is a receiving apparatus 5, formed of an optoelectric transducer 6 and a bundle 7 of glass fibers. The bundle 7 of glass fibers serves as a cross section or shape converter and concentrates the light that falls on a line 8 on the light-sensitive surface of the optoelectric transducer 6. In this connection, for example, the ends of the glass fibers which are directed towards the light-sensitive surface form a circular area.

The row 1 of LEDs is assembled on a printed-circuit board 9, on which also there is accommodated further electronic components required for energization of the row 1 of LEDs. Only one component 10 and a heat sink 11 of the aforementioned electronic components are shown diagrammatically in FIGS. 1a and 1b.

The individual light-emitting diodes of the row 1 of LEDs are energized one after the other, for example, from the left-hand side to the right-hand side of FIG. 1a, with the aid of the circuit shown in FIG. 2. As long as the diodes which are illuminated lie above the paper 3, little or no light reaches the optoelectric transducer 6. More light reaches the optoelectric transducer 6, beginning only from the diode 12, for example, situated in the vicinity of the edge 4, with the result that the resistance of the diode 12 decreases, and the input voltage at an amplifier 20 drops. Because a control circuit can determine which of the diodes is energized at this instant, the position of the edge 4 is thereby established.

A microcomputer 15, in particular, is provided in the embodiment of the circuit shown in FIG. 2 for controlling the individual operations. In order to produce the address of the respective diode which is to be energized, a counter 16 is used, which is synchronized by a clock generator 17. The output signals of the counter 16 are fed in the form of an eight-digit address via a code converter 18 to the row 1 of LEDs. The clock signal generated by the clock generator 17 is fed likewise to the microcomputer 15, the code converter 18 and the row 1 of LEDs.

A phototransistor 6 in the circuit arrangement shown in FIG. 2 is provided as the optoelectric receiver and is supplied with operating voltage via a resistor 19. The output signal, which is dependent upon the incident light, is amplified in an amplifier 20 and is fed to a threshold-value circuit 21. The output signal of the optoelectric receiver 6 is thereby converted into a binary signal, which is fed to an input of the microcomputer 15. The threshold value of the circuit 21 is adjusted so that the binary signal fed to the microcomputer 15 assumes a first state if paper is present between the respectively illuminated diode and the optoelectric transducer 6, and assumes a second binary state when no paper exists between the respectively illuminated diode and the optoelectric transducer 6.

The microcomputer 15 has two parallel outputs, one of which is connected to a load input of the counter 16 and the other output 22 serves for outputting a measurement result.

If all possible addresses are outputted sequentially by the counter 16, all of the diodes will be energized in sequence. The phototransistor 6 becomes conductive at the diode which is located in the vicinity of the edge of the paper. This is communicated, as described hereinbefore, to the microcomputer 15, which outputs, via the output 22, the address of the last-mentioned diode as a measure of the position of the edge of the paper. Of course, this output may be converted into another suitable form, for example, into a number of units of length by multiplication with the grid dimension.

If it is desirable to determine as quickly as possible, for example, at high press speeds, the position of the edge of the paper, then a coarse scanning of the edge can be performed by appropriately controlling the counter 16. This may be accomplished, for example, so that only every tenth diode, respectively, is energized. At the same clock frequency, therefore, the time required for determining the approximate position of the edge of the paper is considerably shortened. If the approximate position is known, that sector of the row 1 of LEDs in which the edge of the paper is located can be scanned in small steps, i.e. from diode to diode. In this regard, the counter 16 can be set by the microcomputer 15 to the starting address of this sector of the row 1 of LEDs.

I claim:

1. Device for detecting a position of an edge comprising a row of a multiplicity of light-emitting elements forming an angle with the edge, a single optoelectric transducer disposed adjacent said light emitter elements for receiving light emitted by said light emitting elements, first means for guiding the edge between said row of light-emitting elements and said optoelectric transducer, second means for pulsatingly energizing said light-emitting elements sequentially, and third means for scanning an output voltage of said optoelectric transducer in synchronism with the pulsating energization of said light-emitting elements.

2. Device according to claim 1, wherein said light-emitting elements are light-emitting diodes.

3. Device according to claim 1, including a converter formed of glass fibers bunched so as to define a varying cross section for concentrating the light emitted by said light-emitting elements.

4. Device according to claim 1, wherein said second means comprise a control circuit for energizing said light-emitting elements sequentially in synchronism with a supplied clock signal, said optoelectric transducer having an output connected via a threshold-value circuit to a logic circuit, said logic circuit being actuatable for further transmitting, as a signal identifying the position of the edge, an output signal of said control circuit which is present when there is a step-change in amplitude of the output voltage of said optoelectric transducer.

5. Device according to claim 4, wherein said control circuit and said logic circuit are at least partly formed by a microcomputer.

6. Device according to claim 5, including a counter serving as an address generator for said light-emitting elements which are to be energized, respectively, said counter having outputs connected via a code converter to said light-emitting elements, said counter being settable by said microcomputer, and including a clock generator for driving said microcomputer, said counter, said code converter and said light-emitting elements.

7. Device according to claim 6, wherein said output of said optoelectric transducer is connected via an amplifier and said threshold-value circuit to an input of said microcomputer.

8. Device according to claim 1, wherein, in addition to a first operating state wherein respectively adjacent light-emitting elements are energized sequentially, there is provided a second operating state wherein energization of certain of the light-emitting elements is skipped.

9. Device according to claim 1, wherein only a given section of said light-emitting elements wherein the edge is locatable is energizable.

* * * * *